United States Patent Office 3,374,183
Patented Mar. 19, 1968

3,374,183
COPPER OXIDE-ALUMINA CATALYST
COMPOSITION
Douglas E. Cooper, Birmingham, Mich., assignor to
Ethyl Corporation, New York, N.Y., a corporation
of Virginia
No Drawing. Continuation-in-part of application Ser. No.
26,698, May 4, 1960. This application Mar. 30, 1961,
Ser. No. 99,340
15 Claims. (Cl. 252—463)

This invention relates to a novel method of preparing supported catalysts and to novel catalysts prepared thereby. While many catalysts can be prepared by various well-known methods, a smaller number can be advantageously prepared by very specialized techniques. One usual manner of catalyst preparation is to impregnate the carrier material with a solution of a salt of the metal, followed by appropriate treatment to convert the metal salt to the desired active form. For example, if the active form is an oxide, the carrier material is impregnated with a suitable metal salt and is then roasted to yield a product bearing an oxide or oxides of the metal. If the finished catalyst is to contain the active agent in a pure metallic state, the oxide formed can be reduced in a hydrogen atmosphere to yield a catalyst composed of the carrier material impregnated with the metal. If a catalyst containing a plurality of metals or oxides is desired, the starting material may be a common solution of the salts of both metals, or the carrier may be impregnated successively with separate solutions of the metal salts. Also, a finished metal or metal oxide catalyst may be impregnated with a solution of other metal salts and then again subjected to a roasting step.

This application is a continuation-in-part of my earlier filed application Ser. No. 26,698, filed May 4, 1960, now abandoned.

While the method described above is satisfactory for the preparation of most catalysts, with some metals, complications become obvious. The available metal salts may be prohibitively expensive; they may not be soluble to a degree to allow sufficient amounts of metal to be deposited on the carrier material, or the reaction products and gases evolved during the subsequent roasting period may be noxious, corrosive, or poisonous. Moreover, difficulties may be encountered in converting some metal salts to the active oxide form. In such cases it becomes necessary to revert to specialized techniques of catalyst preparation.

It is an object of this invention to provide a novel method of preparing supported copper oxide catalysts. By the use of my invention, novel and unexpectedly superior copper oxide catalysts are prepared. Moreover, this technique provides a superior method of preparing such catalysts without encountering any of the problems enumerated above. Among the advantages of using my technique are:

(1) Inexpensive and readily available starting materials.
(2) High concentrations of the copper salt can be put in the solution.
(3) Recycling some of the recoverable gases evolved during decomposition.
(4) The soluble copper salt is easily converted to the active oxide form at relatively low temperatures.
(5) Elimination of the roasting step usually required when using more conventional means.
(6) Elimination of undesirable intermediate or final products such as oxides of nitrogen, halogens, etc.

One of the most outstanding features of the novel catalysts of this invention is their resistance to abrasion and attrition due to physical and thermal shock. I have observed that catalysts made by my method have a harder surface than previous catalysts. In this respect catalysts prepared by the method of this invention are vastly superior to similar catalysts prepared by more conventional means. My new catalysts were tested in special mufflers attached to modern automobiles wherein they were continually subjected to the physical and thermal shocks inherent in such an application. The results were excellent, the catalyst showing very little tendency to chip, craze, or powder. However, with a superficially similar catalyst prepared by a more conventional method not of this invention, catalyst attrition in the form of chipping, crazing, and powdering was very evident after only a relatively short period of operation. In fact, at this point the catalyst had deteriorated to such an extent that much of the catalyst material, in a powdery form, had been carried along with the exhaust gas and discharged to the atmosphere.

According to the present invention, I provide a novel method of preparing copper oxide catalysts supported on certain transitional alumina carriers, which are described in detail below. I also provide novel and impregnated catalysts which comprise copper oxide-transitional alumina compositions prepared by my novel method. Optionally, one or more additional metals may be incorporated in my new catalysts as promoters. My new catalysts are especially suited for the exodation of undesirable ingredients in the exhaust gas stream of internal combustion engines.

According to my method, I convert a starting copper material selected from the class consisting of oxygen-containing salts of copper, including basic salts, oxides of copper, and copper hydroxide to deeply-colored, highly water-soluble, copper-ammonia complexes. I then impregnate a transitional alumina of the type described below with a solution of the complex salt. I thereby produce, after heating to decompose the copper-ammonia complex and drive-off volatile materials, a highly unusual and unique catalyst. One of the more important advantages of my method is that it permits use of insoluble starting copper compounds. Many of these are among the cheapest available copper compounds, but they cannot be used to form catalysts by conventional methods.

Among the oxygen-containing salts of copper which I use as starting materials are acetate, benzoate, carbonate, chromate, nitrate, formate, lactate, oxalate, sulfate and the like. I can use some of these salts in either the normal or basic forms. The basic carbonates are especially desirable materials. I can use cupric and cuprous oxides as well as copper hydroxide.

The reagent with which I react my starting copper compound to form the copper-ammonia complex is either ammonia or ammonium hydroxide. The most desirable form of copper-ammonia complex which I use is that in which the anions are entirely carbonate ions. For example, I may start with the well-known $CuCO_3 \cdot Cu(OH)_2$ and add additional carbonate ions, possible using $CO_2$, or preferably in the form of ammonium carbonate so as to provide one carbonate ion for every cupric ion present in the complex. I then usually prefer to treat the carbonate solution with enough of either ammonia or ammonium hydroxide to complete the formation of the complex salt.

There are two cupric amine complexes commonly recognized in the art. These are diammine copper II, $Cu(NH_3)_2^{++}$, and tetrammine copper II, $Cu(NH_3)_4^{++}$. A diammine cuprous ion, $[Cu(NH_3)_2]^+$, is also recognized. All three ions form highly water-soluble salts and are deep violet in water solution. I can use either of them to form my new catalysts. Which of the copper complexes I use depends upon the particular anion I employ. In the preferred case of carbonates, the tetrammine cupric salt is much more soluble and thus, in most cases, more desirable. With copper acetate I can obtain a highly soluble diammine cupric salt, whereas starting with cuprous oxide, the diammine cuprous salt is formed.

In any event I must always use at least enough ammoniacal reagent to completely convert all the copper present to either the diammine or tetrammine form, as the case may be. This is equivalent to 2 moles of ammonia for every mole of copper converted to the diammine form and 4 moles of ammonia for each mole of copper to be converted to the tetrammine form. Although it is not necessary, ordinarily I prefer to use a slight excess of ammonia to insure complete conversion of copper to the complex. As stated above, when the starting copper compound is a basic copper carbonate, I use an additional source of carbonate ions, preferably ammonium carbonate or carbon dioxide. The amount of such additional agent must be at least enough to convert all copper present to the carbonate form. I then use a slight excess to insure complete conversion to carbonate.

The above stoichiometric conclusions can be illustrated by consideration of preparation of catalyst from one of my preferred starting materials; namely, malachite, which is a form of basic copper carbonate. (Other inexpensive and commercially available basic copper carbonates which I prefer to use are azurite, $[2CuCO_3 \cdot Cu(OH)_2]$ and a mixture of malachite and azurite.) The equation for conversion of malachite to its tetrammine complex is:

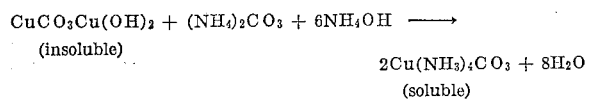

As defined by the above reaction, in order to completely convert the basic copper carbonate to the copper ammonia complex form, one mole of ammonium carbonate and 6 moles of ammonium hydroxide are required per mole of basic copper carbonate. The complete conversion of the basic copper carbonate to the copper complex form is indicated by a clear, deeply-colored violet solution, as contrasted with a cloudy somewhat paler-colored solution if the conversion is incomplete. It is important that the basic copper carbonate be completely converted so as to avoid the deposition of a precipitate material on the catalyst carrier. To assure a complete conversion to the complex form, I often use an excess of ammonium carbonate and ammonium hydroxide, either by having a larger volume, or a more concentrated solution than is stoichiometrically required. The stoichiometry involved in use of other copper starting materials and other ammoniacal reagents will be apparent from the above to those skilled in the art.

The above reactions, exothermic in nature, are not critical with respect to temperature and pressure. They can be easily carried out over a wide temperature range and most conveniently the reactions can be carried out starting at room temperature and at atmospheric pressure.

The reagents that I use to convert the starting copper material to the highly soluble, deeply-colored, copper-ammonia complex may be a gas (ammonia), a solid (ammonium carbonate), or a solution (ammonium hydroxide). Ordinarily, it is most convenient to use a solution form of my reagent or reagents. When using a mixture of reagents such as ammonium hydroxide and ammonium carbonate, I usually combine these two first and then add the basic copper salt. In other cases I have mixed the powdered ammonium carbonate with the copper carbonate and then added the aqueous ammonium hydroxide. Another method is to pass the appropriate amounts of carbon dioxide and ammonia into a suspension of the copper salt in water.

Having prepared the copper-ammonia complex, I next use it to prepare the catalyst of my invention. One way of doing this is as follows:

The carrier material is immersed in or otherwise contacted with the clear, violet-colored solution of the copper-ammonia complex and allowed to become thoroughly impregnated. This step can be accomplished in a minimum of time, usually less than one-half hour. The impregnated carrier material, either removed from or together with remaining copper complex solution, is subjected to gradual heating up to about 300° C. During this heating period, carbon dioxide, ammonia, and water are evolved. Roasting in the ordinary sense is not necessary. However, the heating can be conducted in the presence of oxygen if desired. The ammonia and carbon dioxide may either be recovered or they may be recycled if a continuous process is developed.

The carrier material used for my catalysts consists of an activated transitional alumina having a surface area of at least 75 square meters per gram (m.²/g.) and containing from 0.01 to about 5 percent silica. This specific type of alumina is critical to my invention. The alumina referred to is activated alumina to be contrasted with ordinary aluminum oxides which cannot be used in the catalysts of this invention. The activated alumina is an active desiccant, has active adsorbing characteristics and has the ability to catalyze certain hydrogenation and dehydrogenation reactions; whereas, ordinary aluminum oxides such as those prepared from aluminum hydroxide are essentially void of these properties. Likewise, the use of materials such as porcelain chips, silica gel, pumice, and quartz and the like result in vastly inferior catalysts and cannot be used as the carrier material for the catalysts of this invention.

Generally, the carrier material serves as a support or a binder for the active catalytic agent, but in itself has little, if any, catalytic activity for the reaction in question. Other mechanical functions might be to impart physical strength and to serve as an aid in the dissipation of heat to prevent sintering. For such purposes, any one of the well-known carrier materials may be equally effective. Aside from purely mechanical functions, a carrier material may serve to give a larger exposure of the catalytic agent, increase thermal stability, modify catalytic selectivity and give increased resistance to poisoning of the active agent. Also, a complex formation may take place between the carrier and the active agent which results in an overall material that has better catalytic properties per unit area than the active agent alone. It is because of these non-purely mechanical functions that a carrier material may be specific for a given catalytic agent with respect to a particular reaction; that is, although a catalytic agent on one carrier material may be an excellent catalyst for a specific reaction, it may behave entirely different and be a poor catalyst if supported by a different carrier material.

I have found that copper oxide-transitional alumina catalysts prepared by the method of this invention are excellent catalysts for the oxidation of unburned hydrocarbons and carbon monoxide found in the exhaust gas streams of internal combustion engines. However, catalysts composed of copper oxide on other well-known catalyst carriers and, indeed, even on other grades of aluminas, result in inferior catalysts. In other words, a particular grade of activated alumina carrier is specific for copper oxide for the oxidation of the hydrocarbons and carbon monoxide found in the exhaust stream of internal combustion engines.

One of the most striking and unusual features of my catalysts is the critical nature of the alumina which is employed as a carrier or base. The broad spectrum of aluminas, in general, cannot be used indiscriminately; only certain highly select and specific types of alumina are useful. The aluminas which are used as carriers in my invention can be described as "transitional" aluminas. They are metastable forms which, in general, are produced by heating of alpha or beta alumina trihydrates or of alpha alumina monohydrate. As each of these starting materials, or any mixture thereof, is heated, phase changes take place. A number of intermediate or transitional alumina phases are formed. These are characterized by being only partially or poorly crystalline. They are partly amorphous and partly crystalline. Formation of these phases is reversible. On rehydration, they can be converted back to the starting materials. On prolonged heating, particularly at very high temperatures such as 1150° C., they are converted into the so-called "alpha alumina" which is a stable, refractory type of alumina not applicable to this invention. Conversion of the transitional forms of alumina to the alpha form is irreversible and any substantial conversion to this form is to be avoided in the preparation of alumina carriers of this invention.

In the overall transition between the alumina trihydrates and alpha alumina, several different transitional aluminas are prepared, either simultaneously or concurrently. Some of these transitional phases are convertible to others upon proper heating or cooling. It is immaterial in the practice of my invention which particular transitional alumina is used so long as the carrier predominantly consists of at least one transitional form and so long as the content of alpha alumina in the catalyst is kept at a minimum.

According to the nomenclature used in the pamphlet, "Alumina Properties," Russell et al., published by the Aluminum Company of America, Pittsburgh, Pa., 1956, the names assigned to the various transitional aluminas are gamma, delta, eta, theta, kappa, chi and rho. All these are useful as carriers in my invention. In addition, the alpha monohydrate itself is in a sense a transitional alumina, since it is a product reversibly obtained on heating of either alpha or beta alumina trihydrate under suitable conditions of temperature and time. The alpha monohydrate is also useful as an alumina carrier of this invention. In addition to the transitional forms described above, there is an amorphous alumina which is characterized by having no definitive X-ray diffraction pattern. This amorphous material is usually present along with the transitional aluminas of this invention and for purposes of this invention is included among them.

Any of the transitional aluminas mentioned above can be used singly as a carrier of this invention. I ordinarily prefer, however, to use mixtures of two or more of the transitional aluminas including mixtures of as many as nine. Indeed, in any practicable method of preparation, a mixture of at least two, and usually more than two, is perforce formed.

It appears not possible to describe each transitional alumina in terms of its specific physical properties, other than those mentioned above. Many can be characterized by their X-ray diffraction pattern. Several of these are reproduced on page 28 of the pamphlet referred to above.

It is likewise not possible to ascribe definite preparative procedures to preparation of the transitional aluminas of this invention. Conversion of the starting materials—alpha and beta alumina trihydrates and alpha alumina monohydrate—to one or more of the transitional aluminas of this invention, as well as conversion of one transitional alumina to another is a function of both time and temperature. Heating to a high temperature for a short time could result in a mixture of transitional aluminas having the same composition as is produced by heating the same starting mixture or ingredient to a given lesser temperature for a longer time. Generally speaking, alpha alumina trihydrate is converted to the alpha monohydrate at about 140° C. in air or superheated steam and at about 100° C. in vacuum. Beta alumina trihydrate appears to be readily converted to the alpha monohydrate at about 120–160° C. Heating of the alpha trihydrate to about 140° C. for one hour results in some conversion to the chi transitional form. The chi form in turn, goes over to some extent to the kappa transitional alumina when heated to 500° C. for one hour. Heating of the alpha monohydrate for one hour at 250° C. gives some gamma, which on heating at 850° C. for the same length of time produces some theta transitional alumina, with possible intermediate conversion to delta. Heating of the beta trihydrate to 140° C., in addition to producing some alpha monohydrate, also produces some of the eta activated form. This in turn goes over to theta on heating at 450° C.

The kappa and theta forms are converted to the alpha alumina, not useful in this invention, on heating to 1150° C. for one hour.

In general then, the transitional aluminas used in this invention are prepared by heating a starting alumina selected from the class consisting of alpha alumina trihydrate, beta alumina trihydrate and alpha alumina monohydrate to a temperature of at least 100–150° C. for a period of time sufficient to permit substantial conversion to a transitional alumina but insufficient to convert a substantial fraction of the transitional aluminas irreversibly to the active alpha alumina. In general, prolonged heating above about 1000° C. should be avoided. My carriers in some cases may contain small amounts of either the starting material or alpha aluminas, or both.

In addition to the inherent transitional nature of the alumina itself, certain other properties are essential for use as carriers of this invention. The most important of these appears to be the surface area/mass ratio and the content of silica, $SiO_2$. The transitional aluminas which we use are those whose surface area/mass ratio is at least 75 $m^2/g$. and those having a silica content of from 0.01 to about 5 percent. In order to function efficiently according to my invention, the transitional alumina must meet both these criteria. If the surface is greater than the above minimum but the silica content greater than the above maximum, the alumina does not function well. By the same token, if the silica content is 5 percent or below but the surface area is below 75 $m.^2/g.$, the alumina does not function as a carrier of this invention. Nor does it so function if neither the silica content nor the surface area is within the above specifications.

In illustration of the importance of the above properties, I have tested aluminas with surface areas as high as 350 $m.^2/g.$ but with silica content greater than 5 percent. These have resulted in catalysts with inferior properties with respect to exhaust gas conversion. Also, an alumina with a silica content less than 5 percent but with a surface area of only .5 $m.^2/g.$ was ineffective as a support for copper oxide.

Certain aluminas meeting the requisites of this invention are commercially available. Included in these are those sold by Aluminum Company of America as "Desiccant Grade Active Aluminas; Grade F-1, F-3, and F-10," and by the Kaiser Aluminum Company as "KA-101." The above "F" aluminas are made by the controlled calcination of a rocklike form of alpha alumina trihydrate. See the Russell et al publication referred to above. Analyses and physical properties of typical aluminas of this invention are:

CHEMICAL ANALYSIS

|  | Percent |
|---|---|
| $Al_2O_3$ | 85.0–95.4 |
| $Na_2O$ | 0.4–2.0 |
| $Fe_2O_3$ | 0.02–0.15 |
| $SiO_2$ | 0.02–5 |
| Loss on ignition, 1100° C. | 4.2–8.5 |

PHYSICAL PROPERTIES

|  |  |
|---|---|
| Surface area, $m.^2/g.$ | 75–360 |
| Form | Granular or balls |
| Bulk density, $lb./ft.^3$ | 43–57 |
| Specific gravity | 3.1–3.3 |
| Pore volume, ml./g. | 0.25–0.3 |
| Dynamic sorption, percent | 11–23 |
| Pore diameter, A. | 40–50 |
| Crushing strength, percent | 55–66 |

One method of large-scale preparation of the alumina carriers of this invention is as a by-product of the Fickes-Sherwin modification of the Bayer process in the manufacture of metallic aluminum. During the process, the aluminum trihydrate is precipitated from alkali aluminate solutions. This material, a scale-like deposit, is then crushed or ground, and calcined at a temperature between 300 and 800° C. The finished material is used primarily as a commercial adsorbent. It does not readily pack, can be used in high pressure applications, and after use, can be readily regenerated.

The granular transitional aluminas I use as the carrier material for my catalysts may be from about 2.5 to 8 mesh. (Tyler Standard Screen Scale Sieves). However, I have found materials of from 4 to 6 mesh to be optimum for this exhaust gas application.

An important property of any catalyst is its resistance to attrition and abrasion. This is particularly true with an automobile exhaust application because of the continual agitation and physical shocks to which the catalyst bed is subjected. While the granular form of transitional alumina is an excellent material for this application, we have found that the ball form is particularly resistant to attrition and abrasion. An example of the ball form of transitional alumina is that sold by the Kaiser Aluminum Company as "Activated Alumina KA–101." This material is prepared by the controlled calcination of beta trihydrate, and its finished form is composed mainly of eta alumina and alpha monohydrate. The final product has low silica and titanium dioxide content, 0.02 and 0.002 percent, respectively. Its high surface area and extreme resistance to abrasion make it admirably suited for an exhaust gas application. The material has a hard uniform surface, crushing strength of 66 percent, and excellent thermal stability properties. The sphericity of the active alumina balls eliminates, or reduces to a minimum, the chipping which is evident when using a bed consisting of a granular material. However, the uniform sphericity reduces packing and channeling, resulting in lower pressure drop as compared to a granular catalyst bed. Active aluminas of from about 1/16 to 3/8 inch in diameter or mixtures of alumina balls in this range are suitable for this application. However, I prefer to use those ranging in size from 1/8 to 1/4 inch. Thus, a preferred embodiment of this invention is a catalyst especially suited for exhaust gas conversion, said catalyst consisting of ball form transitional alumina of from 1/16 to 3/8 inch, preferably from 1/8 to 1/4 inch, in diameter, said alumina having a surface area of at least 75 m.$^2$/g. and containing from 0.01 to about 5 percent silica, and being mixed or impregnated with from 0.5 to 25 percent copper in an oxide form.

I further prefer, under certain conditions of operation, to use in the same catalyst bed copper oxide impregnated on two or more forms of transitional alumina. Some ball forms of alumina may have superior properties with respect to attrition whereas some granular forms may be superior with respect to oxidation efficiency. By using both forms of alumina the advantages of resistance to attrition and abrasion of the ball form and the superior oxidation efficiency of the granular form are combined. The different forms of aluminas may be mixed prior to catalyst preparation or jointly impregnated and decomposed to form the finished catalyst. Also, the two catalysts may be prepard independently and mixed after final preparation. The two forms of catalysts may be mixed randomly to form the bed or they may be stratified, horizontally or vertically. The front portion of the bed may be composed of one form and the rear portion of the other form and vice versa. I prefer to have the front portion of the bed composed of a catalyst prepared by using a ball form of alumina and the rear part of the catalyst using the granular form of the alumina as the carrier. By this technique the pulsating and abrasive effect of the entering gas stream is eliminated or reduced to a minimum, being absorbed by the more resistant ball form and the overall efficiency of the bed is maintained at a high level by the more efficient granular form which composes the rear part of the bed. Thus, another preferred embodiment of this invention is a catalyst especially suited for exhaust gas conversion wherein the front 2 to 40 percent portion of the catalyst bed consists of a catalyst using as a carrier material, the ball form of transitional alumina of from 1/16 to 3/8, preferably from 1/8 to 1/4 inch in diameter and the rear 60 to 98 percent portion of said catalyst bed consists of a catalyst prepared by using a granular transitional alumina of from 2.5 to 8, preferably from 4 to 6 mesh, both said ball form and granular form of transitional alumina having a surface area of at least 75 m.$^2$/g. and containing from 0.01 to about 5 percent silica, both said transitional aluminas being impregnated with from 0.5 to 25 percent copper in an oxide form.

I have also found that, under certain conditions, the inclusion of a small amount of another metal or metals may further enhance the properties of my catalysts. The additional metal or metals act as a "promoter"; that is, though in themselves they may have little activity, they impart better characteristics to the finished catalyst. Generally, promoters serve to improve the activity, stability or selectivity for the reaction in question and oftentimes it is difficult to make a distinction as to their specific function. I have found that the inclusion of up to 10 percent, based on the total weight of the catalyst-carrier system, of a promoter metal or metals may to a degree improve efficiency and life of the catalysts of this invention. The promoter in the finished catalyst is usually in an oxide form but in some cases, e.g., silver, it may exist as the free metal. Metals that may be used as promoters include sodium, lead, potassium, magnesium, calcium, strontium, barium, platinum, titanium, chromium, zirconium, iron, cobalt, nickel, manganse, zinc, cadmium, germanium, tin, silver, cesium, gallium, vanadium, scandium and the Lanthanide Series of Elements, including yttrium, lanthanum, cerium, praseodymium, neodymium, promethium, samarium, europium, gadolinium, terbium, dysprosium, holmium, erbium, thulium, ytterbium, and lutetium (see pages 891–893 of "Inorganic Chemistry" by Therald Moeller, John Wiley & Sons, Inc., New York, N.Y. (1952), and the like including metals from Groups I, II, III, IV, V, VI, VII and VIII of the Periodic Table of the Elements. These metals may be introduced before or during preparation of the catalysts as salts such as the nitrate, acetate, carbonate, and the like, or in the form of oxides or hydroxides, or even in some cases as the finely divided metal itself. The salt of the second metal must be judiciously selected so as to avoid the formation of a precipitate.

The following examples illustrate methods of preparing the catalysts of this invention.

*Example I*

F–1 grade alumina is used as the carrier of this example. This transitional alumina has about 92 percent $Al_2O_3$, about 0.8 percent $Na_2O$, about 0.12 percent $Fe_2O_3$, and about 0.09 percent $SiO_2$. On ignition, it loses about 6.0 percent of its weight. It is a granular material having a surface/mass ratio of about 210 m.$^2$/g. Its bulk density (packed) is about 55 lb./ft.$^3$, and its specific gravity is about 3.3. It is prepared by calcination of alpha alumina trihydrate and contains a mixture of the transitional aluminas described earlier in this specification. A solution comprising 5 parts of ammonium carbonate and 18 parts of aqueous ammonium hydroxide (28 percent $NH_3$) is prepared. Eleven parts of malachite [$CuCO_3Cu(OH)_2$] is dissolved in the solution. At this point a deeply violet-colored solution is formed. The copper is in solution as the complex tetrammines copper (II) carbonate

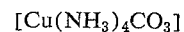
[$Cu(NH_3)_4CO_3$]

The F–1 alumina is then immersed in the solution for a sufficient time to allow thorough impregnation. The time required for this step is usually less than one-half hour. The excess liquid may be drained away. Heat is then gradually applied to the mixture and the copper complex decomposes to the oxide form. During the heating process, gaseous carbon dioxide, ammonia, and water are evolved.

The conversion is essentially completed at temperatures below 300° C. The catalyst of this example is composed of about 10 percent copper in an oxide form impregnated on transitional alumina.

Example II

The procedure of Example I is followed but amounts of basic copper carbonate, ammonium hydroxide and ammonium carbonate are used such that the finished catalyst is composed of 25 percent copper in an oxide form.

Example III

The procedure of Example I is followed but amounts of basic copper carbonate, ammonium hydroxide and ammonium carbonate are used such that the finished catalyst is composed of 0.5 percent copper in an oxide form.

Example IV

A transitional alumina composed of alpha alumina monohydrate, amorphous alumina and small quantities of gamma and theta transitional alumina is mixed with a solution of the azurite form of basic copper carbonate $[2CuCO_3 \cdot Cu(OH)_2]$, ammonium hydroxide and ammonium carbonate. The procedure of Example I followed. The finished catalyst is transitional alumina impregnated with oxides of copper, comprising by weight 10 percent copper in an oxide form.

Example V

Cuprous oxide, $Cu_2O$, is dissolved in a solution of ammonium carbonate and ammonium hydroxide. The highly soluble diammine cuprous carbonate, $[Cu(NH_3)_2]_2CO_3$, is formed. The procedure of Example I is then followed. The finished catalyst is transitional alumina impregnated with 12 percent copper in an oxide form. The transitional alumina is derived from the calcination of beta alumina trihydrate and contains predominantly the eta and theta transitional aluminas along with some alpha alumina monohydrate.

Example VI

F-3 alumina is mixed with a solution prepared from cupric oxide, ammonium hydroxide, and ammonium carbonate and the procedure of Example I is followed. This particular granular transitional alumina has essentially the same elemental analysis as the alumina of Example I. Its loss on ignition is about 7.2 percent by weight, and its surface area is about 200 m.$^2$/g. It is made by controlled calcination of alpha alumina trihydrate and contains a mixture of transitional aluminas. The finished catalyst is F-3 alumina impregnated with oxides of copper comprising by weight 7 percent copper in an oxide form.

Example VII

Ammonia and carbon dioxide gases are dissolved in water forming a solution of ammonium hydroxide and ammonium carbonate. A basic copper carbonate is added, forming a deeply violet-colored solution of tetraammine copper (II) carbonate. Transitional alumina is impregnated with the solution and the procedure of Example I followed. The finished catalyst is transitional alumina impregnated with 10 percent by weight of copper in an oxide form. Principal components include alpha alumina monohydrate and the chi and kappa transitional forms of alumina. On a dried basis the alumina contains 5 percent silica.

Example VIII

A solution of malachite $[CuCO_3Cu(OH)_2]$ in aqueous ammonium hydroxide and ammonium carbonate is prepared. Chromic nitrate is added to this solution. Transitional alumina is introduced into the resulting mixture, and the procedure of Example I is followed. The finished catalyst is transitional alumina impregnated with oxides of copper and chromium, comprising by weight 20 percent copper and 10 percent chromium. The transitional alumina base, KA-101, is made by controlled phase conversion of beta alumina trihydrate, and its primary transitional substituents are the eta form and alpha alumina monohydrate.

Example IX

A mixture of malachite $[CuCO_3Cu(OH)_2]$ and azurite $[2CuCO_3 \cdot Cu(OH)_2]$ is dissolved in a solution of ammonium hydroxide and ammonium carbonate. Silver acetate is added to this solution. Transitional alumina is then introduced and the procedure of Example I followed. This transitional alumina is made by conversion of a mixture of alpha and beta alumina trihydrate and contains substantially all the transitional aluminas, including amorphous alumina and alpha alumina monohydrate. The finished catalyst is transitional alumina impregnated with oxides of copper and silver, comprising by weight 8 percent copper and 1 percent silver.

Example X

Copper acetate is dissolved in ammonium hydroxide to form the deeply violet-colored, highly soluble diammine copper (II) acetate $[Cu(NH_3)_2(C_2H_3O_2)_2]$. The procedure of Example I is followed. The finished catalyst of this example is F-1 transitional alumina impregnated with 12 percent by weight copper in an oxide form.

Example XI

KA-101 alumina is used as the carrier in this example. This transitional alumina has about 95.4 percent $Al_2O_3$, about 0.02 percent $SiO_2$, about 0.02 percent $F_2O_3$, about 0.002 percent $TiO_2$, and 0.40 percent $Na_2O$. On ignition it loses about 4.2 percent of its weight. It is a ball form of transitional alumina having a surface area of about 360 m.$^2$/g. Its bulk density is about 43 lb./ft.$^3$ and has a dynamic sorption of about 19.7 percent. Its crushing strength is 66 percent. It is prepared by the carefully controlled calcination of beta trihydrate and its principle constituents are eta alumina and alpha monohydrate. One-sixteenth inch diameter balls are immersed in a solution of malachite, ammonium carbonate and ammonium hydroxide and the procedure of Example I is followed. In this example the finished catalyst is $\frac{1}{16}$ inch diameter ball form of transitional alumina impregnated with 6 percent copper in an oxide form.

Example XII

The procedure of Example XI is followed but the carrier material for this catalyst is KA-101 ball form of transitional alumina having a diameter of approximately $\frac{3}{8}$ inch. The amounts of starting materials used in this present example are such that the finished catalyst contained 12 percent by weight of copper in an oxide form.

Example XIII

An aqueous solution of basic copper carbonate, $CuCO_3 \cdot Cu(OH)_2$, ammonium carbonate, ammonium hydroxide and cobalt carbonate is formed. KA-101 transitional alumina passed through a No. 5 mesh screen (Tyler Standard Screen Scale Sieve) and retained by an 8 mesh is immersed in the solution. After thorough impregnation, the excess liquid is drained away. The material is then heated to about 600° C. During the heating the copper and cobalt compounds decompose to oxide forms. The finished catalyst is composed of 4 percent copper and 1.4 percent cobalt, both in oxide forms.

Example XIV

The procedure of Example XIII is followed but the starting materials are such that the finished catalyst contains 7 percent copper and 6 percent cobalt in oxide forms.

Example XV

A solution of basic copper carbonate, amomnium carbonate, ammonia, and cobalt carbonate is formed. To this is added a solution of ammonium metavanadate and oxalic acid. KA-101 alumina is immersed in the solution and allowed to stand so as to be thoroughly impregnated. The excess liquid is drained away and the remaining mixture is heated up to about 600° C. to effectuate decomposition. The finished catalyst is composed of 8 percent copper, 3.8 percent cobalt, and 0.5 percent vanadium, all in oxide forms.

*Example XVI*

The procedure of Example XV is followed but the quantities of starting materials are used such that the finished catalyst contains 12 percent copper, 6 percent cobalt, and 3 percent vanadium, all in oxide forms.

The catalysts of this invention are eminently suited to catalyze the oxidation of hydrocarbons and carbon monoxide found in the exhaust gas stream of internal combustion engines. Carbon monoxide is poisonous and is particularly dangerous to human health because it is difficult to detect, being colorless and essentially odorless. Hydrocarbons, though in themselves somewhat less toxic and harmful, can be asphyxiants, if consumed in large volumes. More important is their tendency, by reacting with other atmospheric constituents, to substantially contribute to air pollution. Among the more important detrimental effects attributed to air pollution are damage to property through corrosion, toxicity toward crops and plant life in general, soiling of surfaces, restricted visibility, etc. Even more serious are the effects on human physiology. In a milder state, air pollutants, besides having noxious odors, are irritants to the eyes, ears, nose and throat. In more extreme cases, damage to health has been directly attributed to air pollution. One form of air pollution, a haze-like formation, has been evidenced in certain large cities and is referred to as photochemical smog.

The quality and quantity of unburned and partially oxidized hydrocarbons and carbon monoxide varies widely dependent upon vehicle operating conditions and the conditions of maintenance of the engine. For example, under idle conditions the concentration of unburned hydrocarbons in the exhaust gas may be as low as 300 parts per million; whereas, under decelerating conditions the concentration may be over 5,000 parts per million. Moreover, depending on operating conditions, a variety of partial oxidation products are present in the exhaust gas stream. The failure of just one sparke plug to fire will greatly increase the emission of these noxious products.

Among the major requisites for a system employing a catalyst to oxidize the deleterious materials found in exhaust gas streams of automobiles are the following:

(1) Oxidation of substantial amounts of hydrocarbons and carbon monoxide.
(2) The oxidation should be complete, as intermediate products undergo further reactions with other atmospheric constituents and thereby substantially contribute to smog formation.
(3) The discharged exhaust gas should be free of noxious odors.
(4) The catalyst should be active at relatively low temperatures and thermally stable at relatively high temperatures.
(5) It must operate effectively under a wide variety of conditions as hydrocarbon and carbon monoxide content of exhaust gas varies tremendously, depending on whether the car is idling, accelerating, cruising, or decelerating.
(6) The catalyst must be highly resistant to poisonous effects of the oxidation products of the many constituents found in gasoline.
(7) The catalyst must be particularly resistant to lead salts, both as poisons and as coating materials.
(8) It should preferably not oxidize nitrogen.
(9) The catalyst material should be highly resistant to attrition due ot physical shock.

The high degree of efficiency of my catalysts for an exhaust gas application is shown by the following test: The exhaust gas of a CFR-L head, 7:1 compression ratio single cylinder engine was passed over a catalyst bed consisting of 42 cubic inches of the catalyst material. A secondary air supply to provide oxygen for the oxidation was introduced into the exhaust gas stream just prior to the catalyst bed. This air supply was constant throughout the testing period. During the test the engine was continually cycled, 50 seconds under idling conditions, and 150 seconds at wide-open throttle. The operating conditions for the test is as follows:

TABLE I.—ENGINE OPERATING CONDITIONS

|  | 42 cu. in. catalyst bed test | |
|---|---|---|
|  | Idle | Wide open throttle |
| Engine speed, r.p.m | 750 | 1,140 |
| Volume of exhaust gas, s.c.f.h | 90 | 250 |
| Volume of secondary air, s.c.f.h | 40 | 40 |
| Hydrocarbon (vol. percent) | 0.04 | 0.03 |
| $CO_2$ | 4 | 10 |
| CO | 7 | 3 |
| $O_2$ | 9 | 4.5 |
| Space velocity (v./v./hr.) | 5,350 | 11,900 |

My experience has shown that many catalysts are effective for the oxidation of deleterious exhaust gas constituents when the engine is operated on a fuel free from, or relatively low, in sulfur and organolead antiknock compounds. However, the oxidation products of the organolead compounds and sulfur commonly found in gasolines are poisonous to most catalysts. In an accelerated test to determine the resistance of the catalysts under investigation to lead and sulfur compounds, the engine was operated on a fuel containing the relatively high amounts of 12 grams of lead per gallon as tetraethyllead and 0.12 percent by weight sulfur. With respect to the concentrations of sulfur and lead compounds, the conditions of this test are much more severe than would be encountered in a commercial application wherein fuels contain from about 2 to 4 grams of lead per gallon and from about 0.03 to 0.07 percent by weight sulfur.

The composition of the fuel on which the engine was operated during this test is as follows.

FUEL COMPOSITION

ASTM distillation: ° F.

Initial boiling point _____ 97
    10 percent evaporated _____ 148
    50 percent evaporated _____ 266
    90 percent evaporated _____ 327
    Final boiling point _____ 422

Hydrocarbon type, vol. percent:
    Aromatics _____ 40
    Olefins _____ 4
    Saturates _____ 56

Sulfur, wt. percent _____ 0.12
Lead content, grams per gallon as tetraethyllead __ 12.0

During the entire test, the engine was operated under the conditions shown in Table I. The hydrocarbon and carbon monoxide concentrations of the exhaust gas stream were measured before and after passage through the catalyst bed. The measurements were obtained under equilibrium conditions at wide-open throttle. The high oxidation efficiencies of the catalysts of this invention are illustrated by the data summarized below.

TABLE II.—OXIDATION EFFICIENCIES OF COPPER OXIDE ON TRANSITIONAL ALUMINA CATALYST

| Time, hours | Percent reduction of hydrocarbons | Percent reduction of varbon monoxide |
|---|---|---|
| 0 | 62 | 99 |
| 25 | 59 | 85 |
| 50 | 52 | 75 |
| 75 | 46 | 70 |

The results of this test serve to illustrate the high degree of efficiency of the catalysts of this invention. Even though the fuel contained the abnormally high sulfur and tetraethyllead content, the oxidation efficiencies of the catalysts of this invention remained remarkably high throughout the 75 hour test period. With fuels containing more moderate amounts of tetraethyllead and sulfur content, say 3 grams per gallon and 0.05 weight percent sulfur, oxidation efficiencies are even higher. The same is of course true of lead-free and sulfur-free fuels.

An important feature of the catalysts of this invention is their excellent thermal stabilities. The catalysts bed temperature under normal engine operation may vary from 400 to 1700° F. Under extreme conditions of severe acceleration and deceleration, bed temperatures as high as 1750° F. have been observed. Using catalysts of this invention, catalyst beds have been operated at temperatures at least this high with no apparent damage to the activity of the catalyst. Heat stability is very important because it obviates the necessity of installing a mechanical system to have the exhaust gas by-pass the catalyst bed in case of extremely high temperatures. Such a by-pass system would be required if the catalyst were susceptible to damage at high temperatures. Good thermal stability is also desirable in that it allows the reaction to be carried out at higher temperatures wherein higher efficiencies may be attained. Furthermore, this property becomes important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course this would be possible only if the catalyst could tolerate the higher temperatures due to the insulation.

Still another important feature of the catalysts of this invention is their ability to catalyze reactions at extremely low temperatures. Since catalyst activity generally increases with temperature, in many applications it can be optimized by the simple expediency of increasing reaction temperatures. However, in exhaust gas conversion, temperatures cannot readily be controlled and a rather anomalous requisite of high activity at both low and high temperatures is imposed. The catalysts of this invention are active at a temperature as low as 350° F. i.e., temperatures below that of the exhaust gas stream. At temperatures of 450° F. and above, catalyst efficiency markedly improves. Of course, as the oxidation starts, the heat of reaction serves to raise bed temperatures to a much higher level.

Another feature of the catalysts of this invention is their ability to catalyze the oxidation of nitrogen. This is an important consideration. Oxides of nitrogen, and their subsequent reaction products readily contribute to the formation of photochemical smog and are eye and respiratory irritants.

Catalysts of this invention have been tested under actual operating conditions in modern automobiles with excellent results; namely, substantial and essentially complete oxidation of hydrocarbons and carbon monoxide, a discharge exhaust gas substantially free of noxious odors, activity at both high and low temperatures and under a wide variety of operating conditions and resistance to poisons in the exhaust stream, particularly lead salts and sulfur compounds. The resistance to attrition of the catalysts of this invention is such that special mechanical contrivances are not required to safeguard the catalyst material. The catalyst is simply put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

To aid the oxidation, secondary air is usually introduced into the system to obtain maximum efficiency. This is accomplished by the use of a variable speed blower, so that the amount of secondary air varies with operating conditions. The secondary air supply may also be introduced as a natural flow through the use of an appropriate air scoop or the like.

My catalysts can be used to convert the exhaust gas of any gasolines. The gasolines can be of the aliphatic, aromatic and olefinic type including both straight run and catalytically produced gasolines and any and all mixtures thereof. The gasolines can contain the usual additives including organolead and other antiknock agents such as tetraethyllead, tetraphenyllead, tetramethyllead, mixtures of alkylleads, such as tetraethyllead-tetramethyllead mixtures, ferrocene, cyclopentadienyl manganese tricarboyl, cyclopentadienyl nickel nitrosyl, scavengers, antioxidants, dyes, deposit modifiers, including trimethylphosphate, dimethylphenylphosphate and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil and coal furnaces, residual fuel burners, etc.

I claim:
1. A method for producing a catalyst, which comprises commingling aqueous ammonia and a carbonate of copper, impregnating an alumina base with the resultant mixture, drying the impregnated base to composite with the base a compound of copper and then calcining the dried base to form a composite of alumina and an oxide of copper.

2. A method for producing a catalyst, which comprises commingling aqueous ammonia and copper carbonate, impregnating an alumina base with the resultant mixture in an amount to form a final catalyst containing about 0.5 to 25 percent copper in an oxide form, drying the impregnated alumina, and then calcining the dried impregnated alumina to form a composite of alumina and an oxide of copper.

3. In the manufacture of a catalyst consisting essentially of transition alumina impregnated with copper oxide, the process which consists essentially of forming a deeply violet-colored solution by reacting, in the presence of water, an essentially insoluble copper compound selected from the class consisting of copper oxides, copper hydroxide and copper carbonates with an ammoniacal reagent selected from the class consisting of ammonia, ammonium hydroxide and ammonium carbonate, said solution being characterized in that substantially the only anions present are selected from the class consisting of carbonate anions and hydroxide anions, impregnating said transition alumina with said solution, removing supernatant solution from said alumina, and then heating the residual product whereby copper oxide is formed therein, said transition alumina being of the activated type and having a surface area of at least 75 square meters per gram and a silica content of 0.01 to about 5 percent.

4. The process of claim 3 wherein said reactant copper compound is a basic copper carbonate, and said ammoniacal reagent consists of a solution of ammonium carbonate and ammonium hydroxide.

5. The process of claim 4 wherein said reactant copper compound is the malachite form of basic copper carbonate.

6. The process of claim 4 wherein said reactant copper compound is the azurite form of basic copper carbonate.

7. The process of claim 4 wherein said reactant is a mixture of the malachite and azurite forms of basic copper carbonate.

8. The process of claim 3 wherein said reactant copper compound is cuprous oxide, CU₂O, and said ammoniacal reagent consists of a solution of ammonium carbonate and ammonium hydroxide.

9. The process of claim 3 wherein said reactant copper compound is copper oxide, CuO, and said ammoniacal reagent consists of a solution of ammonium carbonate and ammonium hydroxide.

10. A catalyst composition especially adapted to catalyze the oxidation of exhaust gases, said composition consisting essentially of transition alumina impregnated with 0.5 to 25 percent by weight of copper in an oxide form, said copper oxide being characterized by having been formed by heating a residual product formed in turn by impregnating a transition alumina of the activated type and having a surface area of at least 75 square meters per gram and a silica content of 0.01 to about 5 percent with a deeply violet-colored solution formed by reacting, in the presence of water, an essentially insoluble copper compound selected from the class consisting of copper oxides, copper hydroxide and copper carbonates with an ammoniacal reagent selected from the class consisting of ammonia, ammonium hydroxide and ammonium carbonate, said solution being characterized in that substantially the only anions present are selected from the class consisting of carbonate anions and hydroxide anions.

11. The composition of claim 10 wherein said insoluble copper compound is a basic copper carbonate and said ammoniacal reagent is a mixture of ammonium carbonate and ammonium hydroxide.

12. The composition of claim 10 wherein said insoluble copper compound is selected from the class consisting of malachite, azurite, and a mixture of the two and said ammoniacal reagent is a mixture of ammonium carbonate and ammonium hydroxide.

13. The composition of claim 10 wherein said insoluble copper compound is cuprous oxide, $Cu_2O$, and said ammoniacal reagent is a mixture of ammonium carbonate and ammonium hydroxide.

14. The composition of claim 10 wherein said insoluble copper compound is copper oxide, CuO, and said ammoniacal reagent is a mixture of ammonium carbonate and ammonium hydroxide.

15. The composition of claim 10 wherein said insoluble copper compound is selected from the class consisting of malachite, azurite, and a mixture of the two, said ammoniacal reagent is a mixture of ammonium carbonate and ammonium hydroxide, and said transition alumina consists essentially of sperical particles of from $1/16$ to $3/8$ inch in diameter.

References Cited
UNITED STATES PATENTS

| | | | |
|---|---|---|---|
| 1,589,644 | 6/1926 | Hedenburg | 23—61 |
| 1,937,728 | 12/1933 | Storch | 252—476 |
| 2,034,077 | 3/1936 | Arnold et al. | 252—476 |
| 2,696,475 | 12/1954 | Farrow | 252—463 |
| 2,730,429 | 1/1956 | Abraham | 23—61 |
| 2,800,518 | 7/1957 | Pitzer | 252—463 |
| 2,847,475 | 8/1958 | Voge et al. | 252—463 |
| 3,133,029 | 5/1964 | Hoekstra | 252—466 |

EDWARD J. MEROS, *Primary Examiner.*

OSCAR R. VERTIZ, MAURICE A. BRINDISI, JULIUS GREENWALD, *Examiners.*

G. T. OZAKI, R. D. LOVERING, *Assistant Examiners.*